Jan. 20, 1959 R. K. BEAN 2,869,419
ORTHOPHOTOSCOPE
Filed Aug. 28, 1956 8 Sheets-Sheet 1

INVENTOR
RUSSELL K. BEAN

BY
ATTORNEY

Jan. 20, 1959 R. K. BEAN 2,869,419
ORTHOPHOTOSCOPE
Filed Aug. 28, 1956 8 Sheets-Sheet 2

RUSSELL K. BEAN INVENTOR

BY [signature]

ATTORNEY

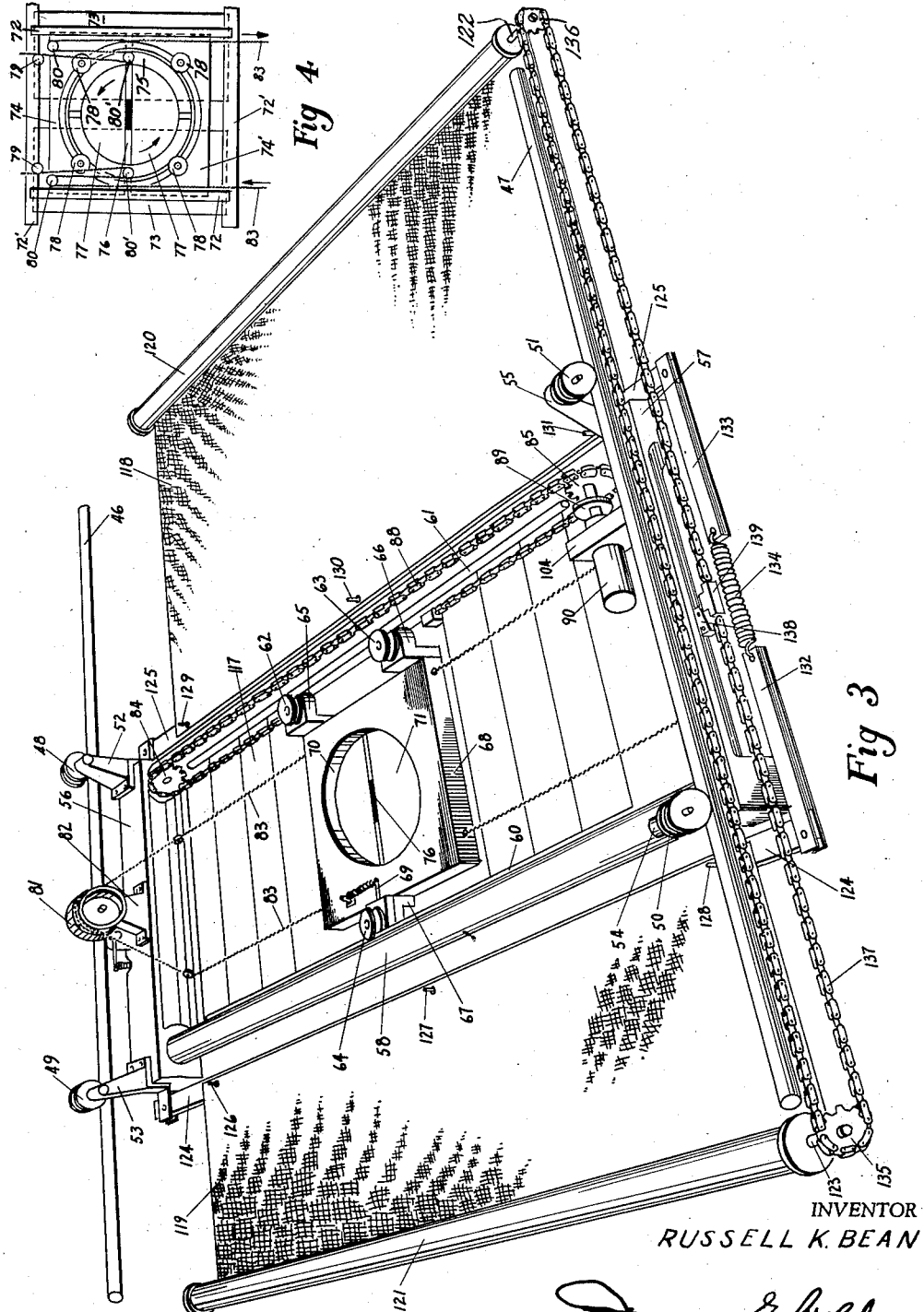

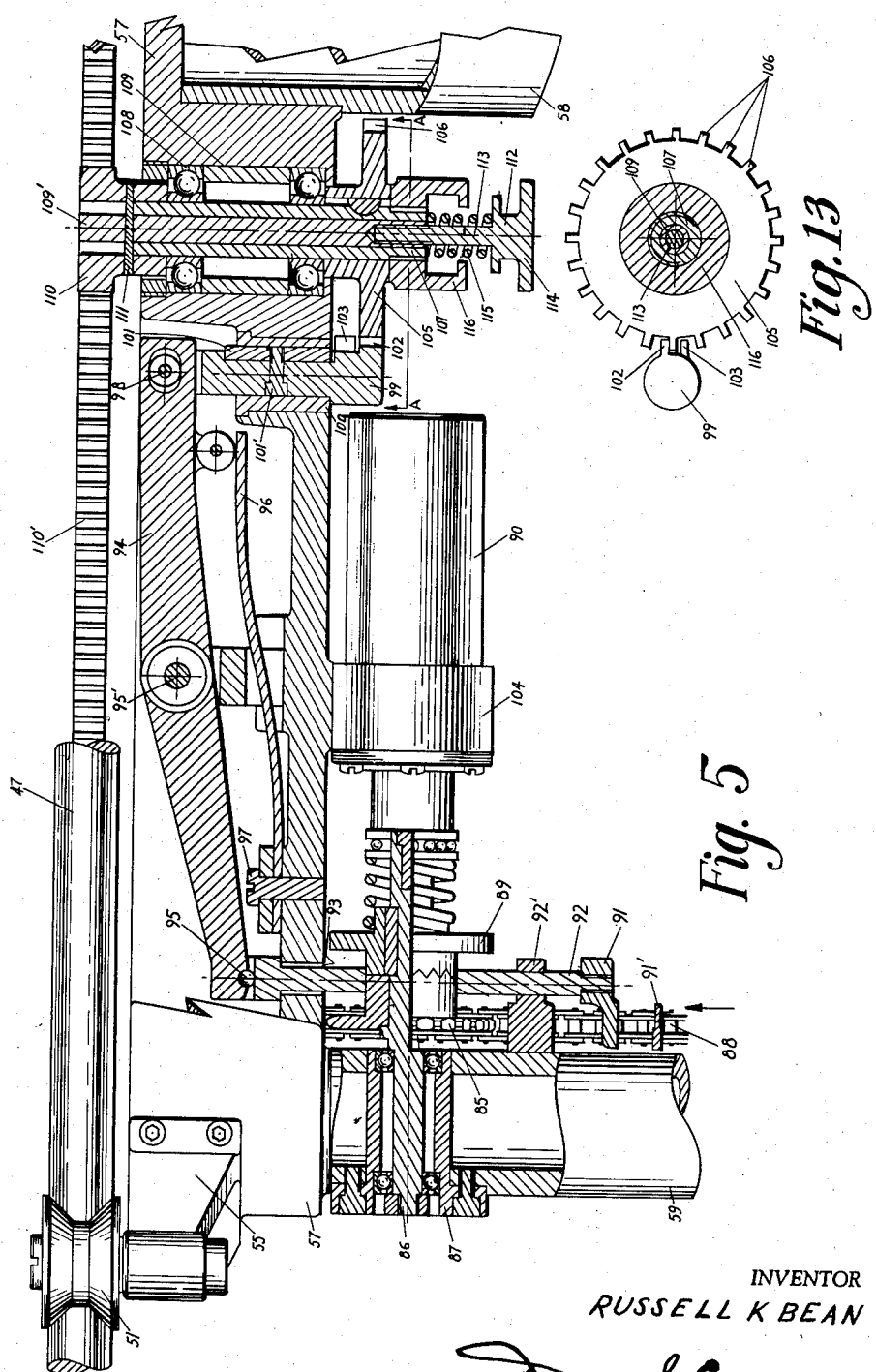

Jan. 20, 1959  R. K. BEAN  2,869,419
ORTHOPHOTOSCOPE
Filed Aug. 28, 1956  8 Sheets-Sheet 5
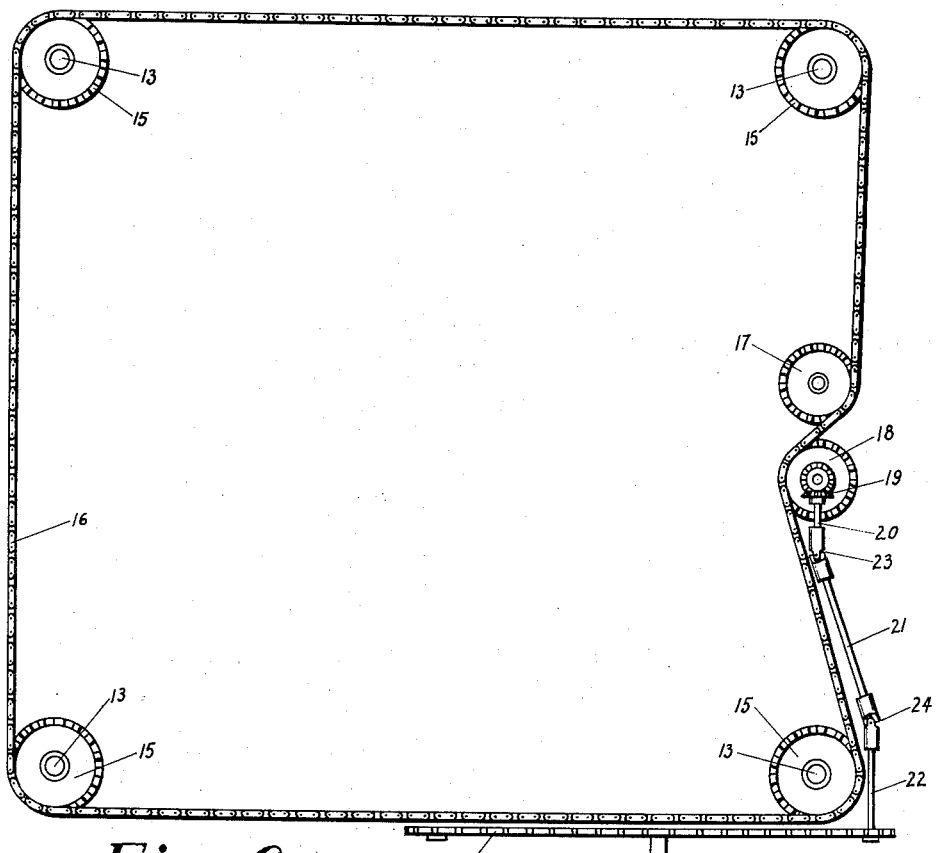
Fig. 6
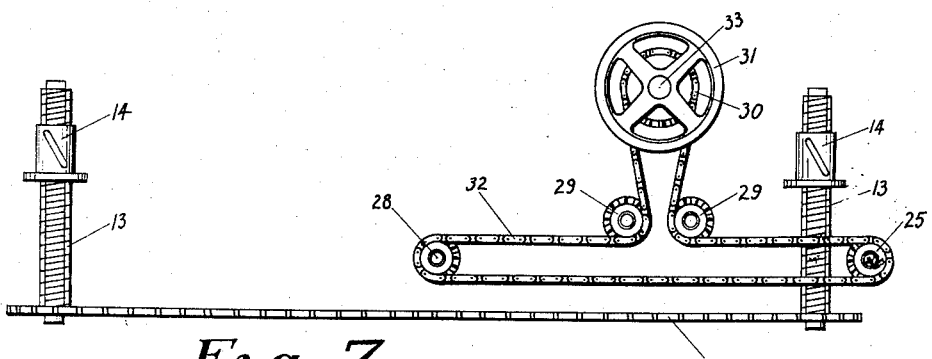
Fig. 7
INVENTOR
RUSSELL K. BEAN
ATTORNEY

RUSSELL K. BEAN INVENTOR

Jan. 20, 1959 R. K. BEAN 2,869,419
ORTHOPHOTOSCOPE
Filed Aug. 28, 1956 8 Sheets-Sheet 7
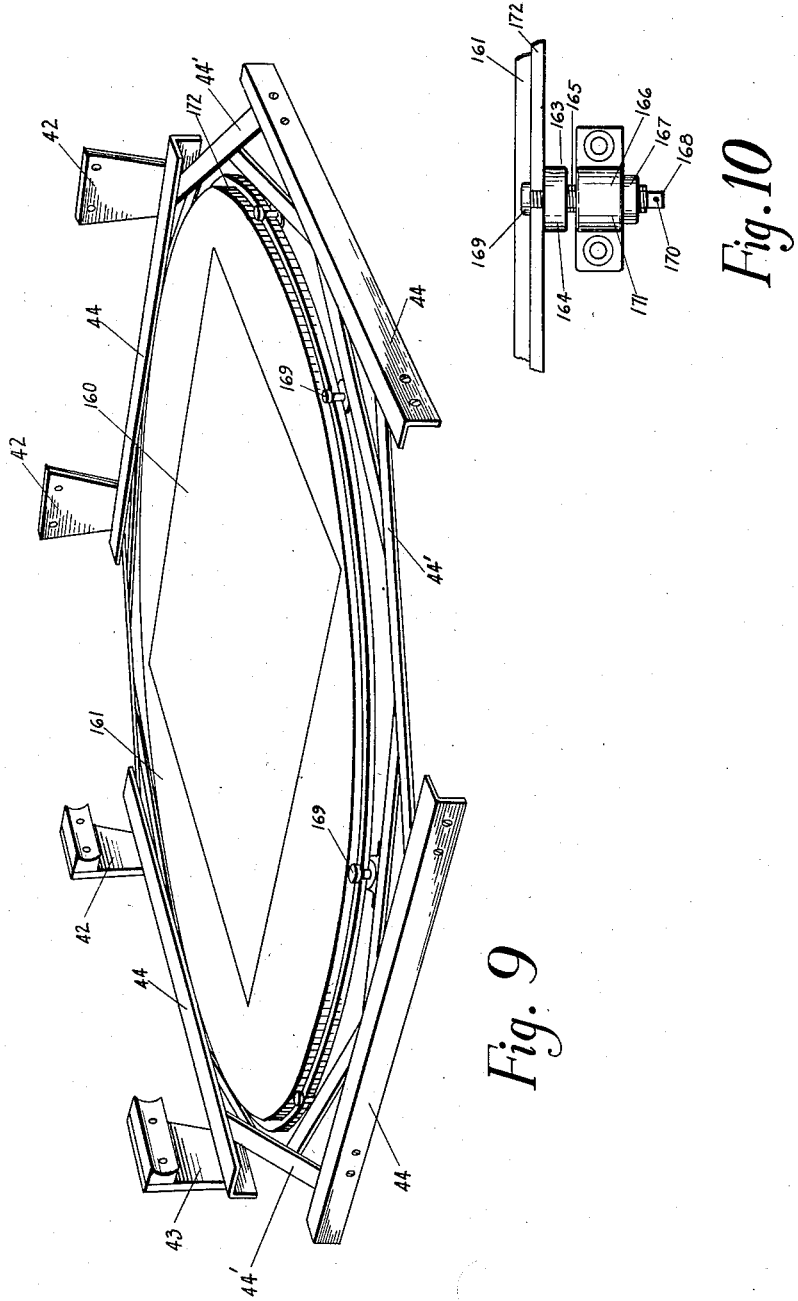
INVENTOR
RUSSELL K. BEAN
BY Donald T. Welch
ATTORNEY Jan. 20, 1959

R. K. BEAN 2,869,419

ORTHOPHOTOSCOPE

Filed Aug. 28, 1956

RUSSELL K. BEAN INVENTOR

BY

ATTORNEY

United States Patent Office 2,869,419
Patented Jan. 20, 1959

2,869,419

ORTHOPHOTOSCOPE

Russell K. Bean, Vienna, Va., assignor to the United States of America as represented by the Secretary of the Interior Application August 28, 1956, Serial No. 606,788

12 Claims. (Cl. 88—24)

(Granted under Title 35, U. S. Code (1952), sec. 266)

This invention herein described and claimed may be manufactured and used by or for the Government of the United States of America for governmental purposes without the payment of any royalty thereon.

This invention relates to apparatus for producing by photographic means substantially exact photo-maps which are orthogonal projections of the ground on a horizontal plane.

As is well known, photographs taken with conventional cameras are perspective views of the area photographed. The scale of such a photograph is uniform only if every object in the photographed area lies in a single plane parallel to the sensitized plane of the film in the camera. Aerial photographs have scale distortion caused by relief of the terrain and tilt of the camera.

There has long been a need for photographs on which data may be plotted, or which may be scaled off directly, without the necessity for making adjustments for a varying scale due to tilt and relief. Tilt can be substantially removed from single photographs by standard rectification procedures, but relief distortion cannot be corrected by these means. In stereoscopic plotting instruments for making precise maps, adjustment may be made to compensate for tilt and relief, so that the maps produced are correct and have a uniform scale; but the photographs per se are not rectified.

An orthographic photograph, wherein there is no scale distortion due to relief or tilt would be of great value to engineers, geologists, foresters, surveyors, or other persons needing accurate mapping information, since the photograph would have a wealth of detail not usually found even on good topographic maps. The user could plot field observations directly on the orthographic photograph, in their correct positions and orientation without the necessity of first making a conventional base map himself, or delaying the work for a lengthy period until a base map becomes available from another source.

My device, which I call an "orthophotoscope," does not produce actual orthographic photographs of the terrain; rather it is a means for producing the equivalent of orthographic photographs from perspective photographs of the terrain. The equivalent photographs produced by this method are called "orthophotographs," and serve the same purpose as would orthographic photographs.

The principal object of the invention is to provide an improved means for converting conventional perspective photographs to the equivalent of orthographic photographs.

A further object of the invention is to provide a device of the character desired incorporating means for simply and rapidly raising and lowering a platen carrying a photographic emulsion.

Another object of the invention is to provide a device of the character described incorporating a scanning slit movable in a transverse and longitudinal direction parallel to the platen.

Another object of the invention is to provide a device of the character described wherein the scanning slit is activated automatically to move in longitudinal and transverse directions.

Another object of the invention is to provide a device of the character described, wherein the sensitized emulsion is covered by light impervious longitudinally movable screens and transversely telescoping shutters, save for the scanning slit.

Other objects and advantages of this invention will be apparent from the detailed description of the invention.

In this connection, any of the usual double-projection stereoscopic plotters employing the anaglyphic principle; such as the multiplex, described in U. S. Patents, 1,980,657, 2,164,847, and 2,263,341, the Kelsh, described in U. S. Patents 2,451,031 and 2,492,870, or the ER-55 described in U. S. Patent 2,727,432; is used to project two conventional overlapping aerial or terrestrial photographs on a screen. One of the photographs is projected through a blue-green filter and the other through a red filter. The projectors are properly oriented to form a correct stereoscopic model exactly as in map-plotting procedures. The screen is opaque except that it has one small opening called a "scanning slit." In direct contact with the screen is a sheet of photographic film having an emulsion sensitive to the blue-green light, but not to the red light. The sheet of film rests in turn on a flat platen which is parallel to the datum plane. By a mechanical arrangement, the screen can be moved in a horizontal plane, parallel to the film, either in the X- or Y-direction (i. e., longitudinally and transversely). The film, however, remains in a fixed relation to the two projectors except in the Z-direction (up and down). The movement of the screen is controlled so that the scanning slit can be passed over the film in any desired direction causing a piecemost exposure of the film to the projected images through the slit. The platen bearing the film and screen may be raised or lowered, manually or otherwise, whereby the scanning slit may be kept "on the ground" in the stereoscopic model. The screen and film remain essentially in contact at all times as the screen slides horizontally over the film. Motion of the screen in the direction of scanning can be regulated for automatic operation at a fixed speed. When a given strip has been scanned, the scanning slit is shifted its own width in a direction perpendicular to the direction of scanning. This may be accomplished automatically by an escapement device.

In the drawings:

Fig. 1 is a front diagrammatic view of the orthophotoscope mounted on an ER-55 plotter, which is described in U. S. Patent 2,737,846.

Fig. 3 is a perspective view showing the travelling slit and light shielding means with associated elements, some elements being omitted for the sake of clarity.

Fig. 4 is a plan view of the scanning slit, with the upper face of the screen removed.

Fig. 5 is a plan view, partly in section, of the driving mechanism for moving the scanning slit.

Fig. 6 is a plan view of the chain and sprocket means for raising and lowering the platen.

Fig. 7 is a front elevation of Fig. 6.

Fig. 9 is a perspective view of the platen and associated framework.

Fig. 10 is a view showing the details of the platen levelling screws.

Fig. 13 is a view taken along line A—A in Fig. 5.

Figure 1:
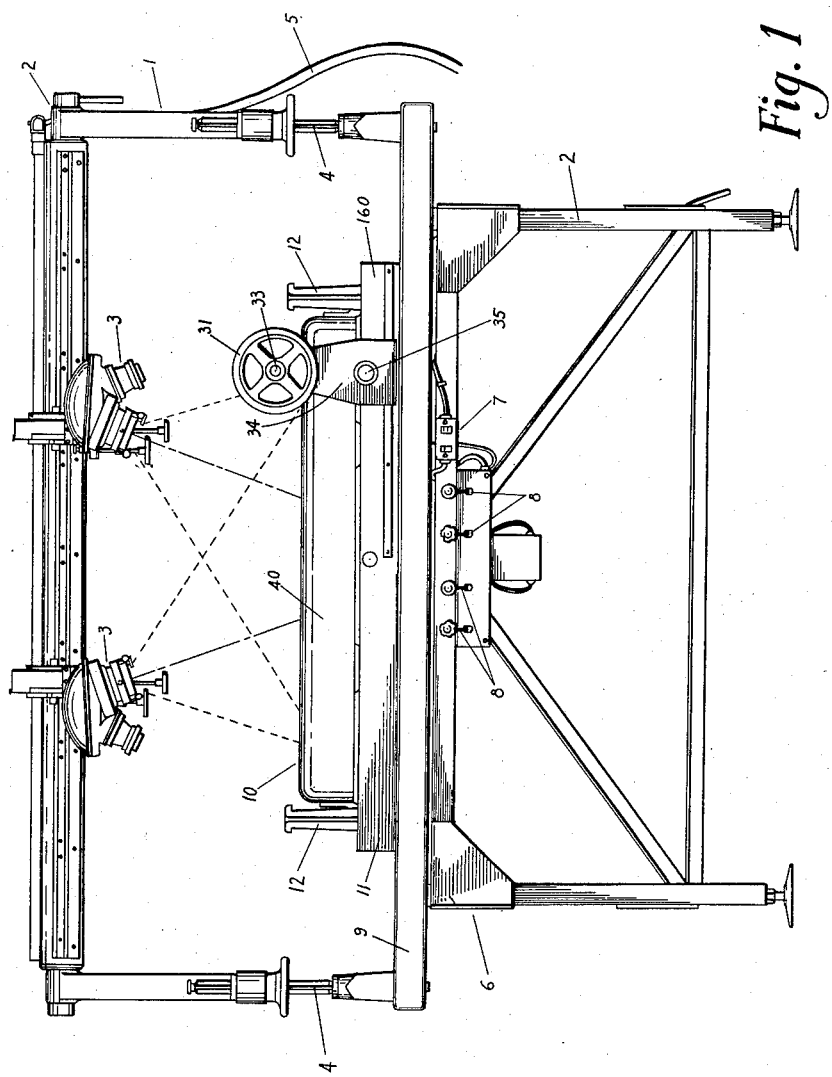
Figure 2:
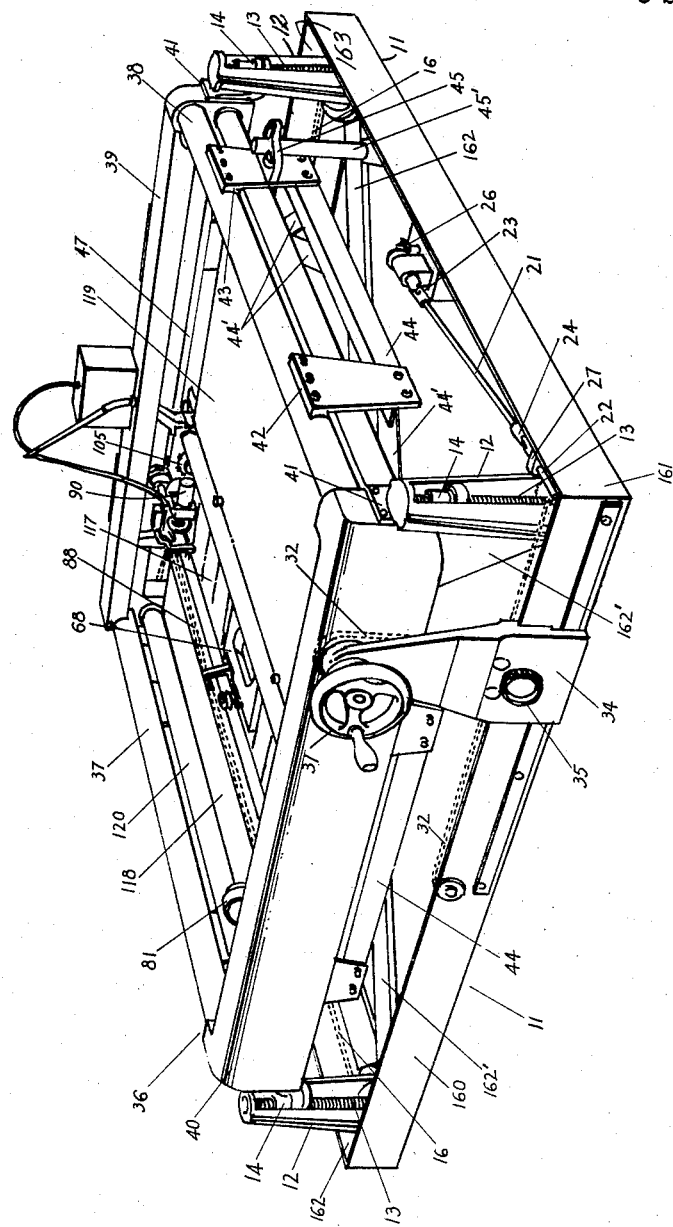
Fig. 2 is a perspective view of the orthophotoscope.

Referring now to Fig. 1, 1 represents an ER-55 conventional twin projector stereoplotting unit, having framework 2, projectors 3, adjusting screws 4 and power cable 5, mounted on table 6. Switch 7 and controls 8 for the projectors and other lamps are mounted on table 6 at a place convenient for the operator. The orthophotoscope 10, is seated on table top 9. Base frame 11, which is shown in Fig. 2, is rectangular in shape and formed from four angle irons 161, 162, 163, 164 and diagonal bracing bars 162'. Said frame has fastened at its corners shields 12 encasing ball bearing leg screws 13, which are rotatably mounted at their upper and lower ends. Threaded on leg screws 13 are nuts 14, which are vertically and freely movable thereon. Sprockets 15 (Fig. 6) are fastened to the lower ends of leg screws 13 and engage an endless chain 16, so that on movement of the chain, all sprockets rotate in unison. Also in engagement with chain 16 are idler sprocket 17 and drive sprocket 18. The latter is caused to rotate by bevel gears 19, which are linked by shafts 20, 21 and 22, and universal joints 23 and 24 to sprocket 25 (Fig. 7). As shown in Fig. 2, shield 26 encases sprocket 18, bevel gears 19 and shaft 20. Bracket 27 is fastened to an inner side of frame member 161 (Fig. 2) and shaft 22 passes through a bearing opening therein. Associated with sprocket 25 (Fig. 7) is endless chain 32, which engages sprocket 28, idler sprockets 29 and drive sprocket 30. The latter is mounted on one end of shaft 33, which has at its other end handwheel 31.

Bracket 34 is slidably mounted on base frame member 160 and may be fixed in position by clamping nut 35. Idler sprockets 29 (not visible in Fig. 2) and a shaft 33 are rotatably mounted on bracket 34. By this arrangement, bracket 34 together with handwheel 31, may be shifted laterally as desired for best operation.

Positioned above the base frame 11 is a movable rectangular frame 36 (Fig. 2) which consists of two parallel tubular members 37 and 38 rigidly mounted in two arcuate castings 39 and 40, having recessed inner faces. Nuts 14 are rigidly fastened to the corners of frame 36 via brackets 41. Turning handwheel 31 thereby causes frame 36 to move vertically by reason of the movements of chain 32, sprocket 25, shafts 20, 21 and 22, bevel 19, chain 16, and sprockets 15, which turn screws 13 in nuts 14.

Fastened to tubular frame member 38 are hangers 42 and 43, attached at their lower ends to angle irons 44 (Fig. 9). Each one of members 44 has two hangers (only four are shown in Fig. 9), which are attached to the upper frame elements 37, 38, 39 and 40 in the manner shown. Attached to hangers 43 (shown in Figs. 2 and 9) at right angles thereto is a bracket 45 having an opening with anti-friction rollers mounted therein through which a guide post 45' slidably passes. Post 45' is fastened to the inner side of frame member 161. A similar arrangement is present on the opposite side of the frame on member 37. By this means, swaying motion of upper frame 36 is prevented.

Mounted on the inner portion of frame 36 is the scanning assembly, which consists of a longitudinally movable carriage and a transversely movable scanning screen mounted in said carriage. Tubular tracks 46 and 47 (see Fig. 3) are fastened to the arcuate castings 39 and 40, and are located in the concavity thereof as shown in Fig. 2. Wheels 48, 49, 50, 51 (Fig. 3), which have a concave surface corresponding to the convex surface of 46 and 47, run on the tracks and are rotatably mounted on brackets 52, 53, 54 and 55, respectively. Brackets 52 and 53 are attached to the ends of frame member 56, and similarly brackets 54 and 55 are attached to the ends of frame members 57 (Fig. 5). Transverse tubular members 58 and 59 are rigidly fastened to elements 56 and 57. Mounted on the inner portion of members 58 and 59 are tracks 60 and 61 on which run guide wheels 62, 63 and 64. Said wheels 62 and 63 are rotatably mounted on brackets 65 and 66 fastened to one side of screen 68. On the other side of screen 68, wheel 64 is mounted on a spring biased lever 69, pivoted on bracket 67, so that said wheel may be retracted from its guide track by moving the lever, enabling the screen to be lifted.

Circular opening 70 is located at the center of screen 68. Mounted on the underside of screen 68 is scanning slit means 70, which consists of four thin metal strips 72 (transverse) and 72' (longitudinal) arranged to form a rectangle as shown in Fig. 4, and fastened together, as by screws (not shown). Adjustably fastened to the underside of strips 72' are two thin rectangular metal leaves 73, arranged in parallel, with a space between them. Two thin metal yokes 74 and 74', having semicircular cut-out portions, rest on leaves 73 and are adjustably fastened to the underside of the strips 72. Since the metal strips are all of the same thickness, elements 74 and 74' are flush with bottom strips 72'. Mounted within the circle formed by the two yokes is a ring 75 having adjustably mounted thereon two semicircular thin, metal plates 77, whose diameters are parallel and are spaced apart to form a thin slit 76. The ring is rotatably held in place by four rollers 78, mounted on yokes 74, and engaging ring 75. String 83 passes over guide pins 80 fastened on the yoke 74, guide pins 80' fastened on ring 75, and guide pins 79 mounted on leaves 73.

Knob 81 is rotatably mounted on bracket 82 fastened to member 56. Endless spring 83 is wound around knob 81; passes through the scanning screen 68 and passes through pulleys (not shown) mounted on frame member 57. The tension is adjusted so that turning knob 81 causes string 83 to move, thereby pulling on one of the pins 80' and causing ring 75 and its associated plates 77 to rotate, thereby angling the scanning slit 76.

Rotatably mounted at the ends of member 59 are vertical sprockets 84 and 85. As shown in Fig. 5, sprocket 85 is keyed to a shaft 86 which fits in ball-bearing assembly 87 mounted in an opening in member 59. Sprocket 84 is similarly attached at the other end of member 59. Chain 88 engages both sprockets, and as shown in Fig. 3 is fastened detachably at its under portion to movable screen 68. Sprocket 85 is connected to an electric motor 90, whose speed may be controlled, via a conventional overload toothed clutch 89. Motor 90 is fastened to supporting member 57 via integral bracket 104.

Adjustably mounted on chain 88 are two dogs 91' (only one shown), one on the upper portion and one on the lower portion of the chain, both of which are adapted to engage the trip arm 91, which extends vertically above and below the upper and lower portions of chain 88 and is attached to two push rods 92, one of which is above clutch 89 and the other below to form a yoke. In Fig. 5, a section is taken through the bottom rod to show the relationship of the various elements, so only one rod 92 appears. Rod 92 slidably passes through an opening 93 in carriage frame member 57 and is slidably supported by bracket 92' attached to tubular member 59, and bears against ball bearing 95 mounted at one end of arm 94. Rocker arm 94 is pivotally mounted on frame member 57 at 95', and is spring biased by leaf spring 96 which is fastened to member 57 by screw 97 so that ball bearing 95 is constantly in engagement with rod 92. Linked to the other end of rocker arm 94 by pivot 98 is stop rod 99 which slidably passes through a bushing 100 fitted into an aperture in frame member 57.

Key 101 is fastened to rod 99 by means of screw 101', and fits into a keyway in bushing 100. At the lower end of stop rod 99 are two teeth 102 and 103 located one below the other which are angularly offset from each other in plane normal to the rod axis a distance equal to the width of one tooth 106 discussed below. Engaging tooth 102 is escapement wheel 105 having a plurality of spaced teeth 106. Escapement wheel 105 is keyed to hollow shaft 107 which passes through ball bearing 108 mounted in an aperture 109 in frame member 57. Slidably mounted in hollow shaft 107, but rotating therewith, is rod 109' having gear 110 mounted thereon by means of a pin 111. Threaded into the opposite end of rod 109' is lock out knob 112 having shaft 113 and head 114. Surrounding shaft 113 and bearing against the lower end of head 114 and the upper part of hollow shaft 107 is spring 115. Enclosing spring 115 and mounted on member 57 is a shielding cup 116. Pressing knob 114 inwardly causes rod 109' and the associated gear 110 to move in the same direction. The carriage assembly is under a constant force, caused by a counterweight (not shown) which tends to move the carriage assembly to the right (Fig. 5). Gear 110, when in the position shown in Fig. 5, engages a rack 110' fastened to frame 39, which is parallel to guide track 47. In order to move the carriage for setting purposes, knob 112 is pushed upwardly, causing gear 110 to be disengaged from its associated rack 110'. The carriage can then be moved to its desired location, and on releasing the knob, gear 110 again engages the rack.

The operation of the automatic scanning mechanism as follows: motor 90 turns drive sprocket 85, which draws chain 88 and its associated lower dog 91' toward trip arm 91 attached to push rod 92. Dog 91' moves push rod 92 upwardly (as shown in Fig. 5) causing rocker arm 94 to pivot about 95'. Stop rod 99 moves downwardly, disengaging tooth 102 from a tooth 106 on the escapement wheel. Since the whole carriage assembly is under a constant force, releasing the escapement wheel causes the carriage to move to the right, and gear 110 moves on its rack until lower tooth 103 engages another tooth on the escapement wheel 105. At the completion of this cycle, trip arm 91 engages a conventional reversing switch (not shown) which reverses the motor, causing the dog 91' on the lower chain to move back (downwardly in the figure) away from the shoulder 91. Due to spring 96, rocker arm 94 acts to push trip arm 92 down and pull stop rod 99 up. Tooth 103 now disengages the tooth on the escapement wheel 105, whereby the escapement wheel 105 and gear 110 again rotate permitting the carriage to move transversely until tooth 102 again engages this tooth on escapement wheel 105. This transverse motion is slight, since the distance between teeth 102 and 103 is substantially equal to the width of tooth 106. The dog on the upper chain now moves in a downwardly direction until it too comes into contact with trip arm 91, whereupon the above described tripping action and reversing action is repeated. Since the screen 68 is attached to chain 88, it is apparent that the scanning slit is automatically moved transversely back and forth in the Y-direction the desired distances and then is automatically stepped over longitudinally. The amount of longitudinal step-off can be varied by various combinations of teeth spacing on the escapement wheel. Spacing the dogs on the upper and lower portion of chain 88 determines the amount of transverse motion of the carriage. In all cases, the amount of step-over has to be equal to the width of the scanning slit.

Sensitized paper 160 is placed on circular platen 161 located underneath and parallel to screen 68 and mounted on bracing 44' (Fig. 9) so that the emulsion is in close proximity to the scanning slit means.

The platen is adjustably mounted on framework 44' by means of a plurality of leveling screws 163. These screws consist of a flat disc-like upper bearing portion 164, which is in contact with the bottom circumferential edge of the platen, a threaded shank 165 and a square end section 168, having a hole 170 which can be gripped by a wrench or engaged by a pin in order to rotate the screw. The threaded shank passes through an internally threaded bearing block 171 which is fastened to a frame member 44'. Lock nut 167 serves to lock the levelling screw 163 in place. Platen 160 has a circumferential shoulder 172 which engages locking screw 169, threaded into the upper bearing portion 164.

Figure 12:
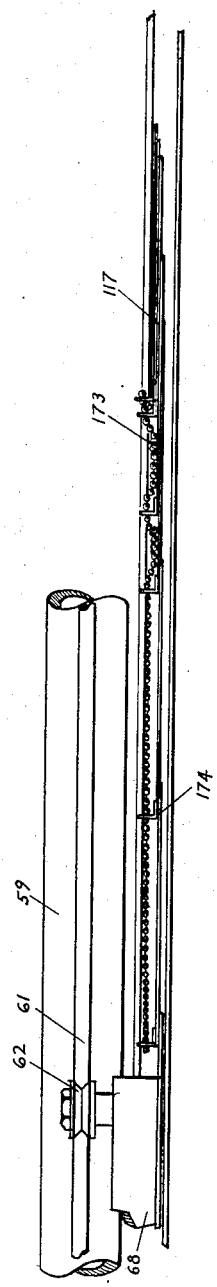
Fig. 12 is a portion of a view taken along line B—B in Fig. 11 showing details of the telescoping light shield.

In order to shield the emulsion from light, the portion not under the scanning slit is covered (Fig. 3) by telescoping light shields 117 and movable, flexible screens 118 and 119. Light shields 117 consist of individual rectangular thin strip of metal which can slide one over the other, but are prevented at their edges from becoming disengaged, by chain 173 attached to clips 174 (Fig. 12). The shields are fastened to screen 68, so that on moving the screen transversely one portion of the shield becomes extended and the other retracted.

The space between the tubular frame member 58, 59 and the movable screen 68 is shielded by horizontal upper strips 176 mounted on supports 175 which are attached to the underside of 58 and 59. These strips are equal in length to 58 and 59. Horizontal strips 177, fastened to 175 support the light shields 175.

Flexible screens 118 and 119 are fastened at one end to rollers 120 and 121 respectively, which are fixed to shafts 122 and 123, rotatably mounted in frame members 39 and 40. The other end of the screens are attached to rods 124 and 125 by means of pins 126, 127 and 128, which are mounted on rod 124, and pins 129, 130 and 131, which are mounted on rod 125. Rods 124 and 125 each have pivoted at adjacent ends short rods 132 and 133. Connecting these latter members is spring 134. The other ends of rods 124 and 125 (not shown) are connected in the same manner. Keyed to shafts 122 and 123 are sprockets 135 and 136, having endless chain 137 associated therewith.

Since the tension of spring 134 acts to clamp rods 124 and 125 to the sides of supporting frame members 56 and 57, these rods move as a unit when the carriage moves longitudinally. Sprockets 135 and 136 and associated chain 137 cause the rollers 120 and 121 to unroll and roll in unison as the rods move. Lug 138 is mounted on frame member 57, and engages adjustable stop 139 mounted on chain 137. The stop is positioned on chain 137 to give the length of longitudinal movement of the carriage desired.

Figure 8:
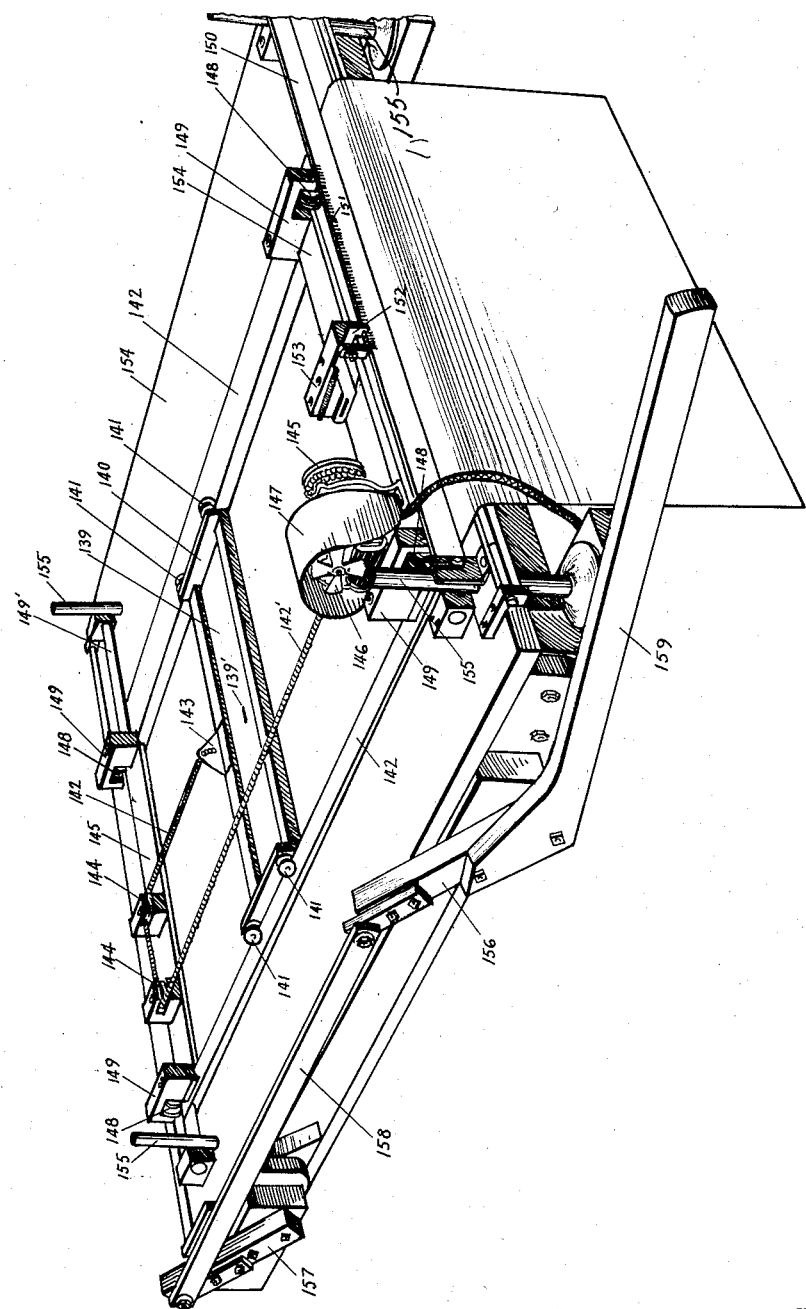
Fig. 8 is a perspective view of another form of the orthophotoscope.
Figure 11:
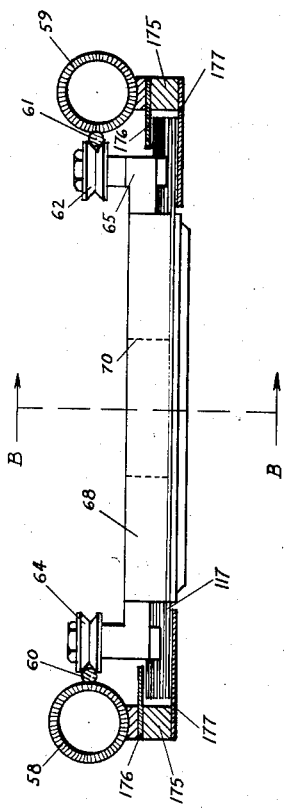
Fig. 11 is an end view of a section through the movable screen having a somewhat different arrangement for mounting the guide wheels.

A simplified version of the invention is shown in Fig. 8, wherein scanning slit assembly 139 is mounted on a rectangular carriage 140 supported by four rollers 141, running on tracks 142. The carriage is attached to one end of chain 142' by means of bracket 143. Chain 142 passes over pulleys 144 mounted on rear bar member 145, which is attached to tracks 142. The other end of chain 142' is fastened to pulley 145 attached to the shaft of electric motor 146 covered by hood 147. Revolution of the motor acts to cause transverse motion of the scanning slit 139'. At the end of the transverse run the motor is cut off, either by hand or by an automatic cut-off switch, and the carriage moved by hand to the starting position for the next run. Transverse motion for the carriage is provided by four rollers 148 mounted in carriers 149 attached to the ends of tracks 142. Said rollers 148 ride on rear track 149' and front track 150. The front track has a series of slots 151 cut into it. A retainer arm 152, mounted on a block 153 attached to the carriage by frame element 154 fits into slots 151. On raising the retainer, the carriage may be moved longitudinally by hand, to the desired set-off whereupon the retainer is again inserted into slot 151. The framework and carriage is mounted on rectangular table 154, which has four vertical guide posts 155 adjacent its corners. The table is raised and lowered by means of crank arms 156 and 157, linked together by bar 158. Arm 156 has a handle 159 attached thereto. Passing underneath the table are two rotatable shafts (not shown) parallel to the long axis of member 139, on which crank arms 157 and 158 are fixed. Attached to these shafts are cams on which the bottom of the table rests. On moving handle 159 up and down crank arms 156 and 157 and their associated shafts and cams move, causing the table to move up and down.

In operating the orthophotoscope shown in Figures 1–7, the operator first completes the orientation of the stereoscopic plotting instrument so that the stereoscopic model is properly related to horizontal and vertical control points plotted on a base sheet at a particular scale. Alternatively, he may use a "set-up" which is the result of regular mapping. The orthophotoscope is then placed on the table top of the stereoscopic plotting instrument and adjusted so that the platen of the orthophotoscope is parallel to the table top and remains parallel as the platen is raised or lowered. The operator adjusts the position of the screen so that the scanning slit (temporarily covered) is at the point where scanning is to begin, usually a corner of the neat model. The regulating mechanism is set for the desired speed of scanning (usually in the Y-direction). The room lights are then turned off, the projector lights turned on, one being red and the other blue-green, and the scanning begins. A strip is scanned in the selected direction, the operator manipulating the height regulating handwheel so that the slit is always in contact with the apparent ground surface of the optical model. This results in the exposure of a strip of film of a width equal to that of the scanning slit and to a length equal to the length of the model in the selected direction, or to such other length as the operator may select. The platen is maintained at the correct elevation so that relief displacement of images is eliminated. Only the images projected through the blue-green filter affect the emulsion on the film. After the first strip has been scanned, the screen is automatically positioned for scanning the next strip. The driving mechanism moves the screen so that the slit motion is parallel to the path of the first strip, and displaced from it by an amount equal to the slit width. By turning knob 81, the slit may be constantly oriented so that it is maintained at the average strike of the terrain. The second strip is then removed and developed by conventional photographic techniques to give a negative covering the model area, with tilt and relief displacements removed. Positive prints can then be made from the regative.

It should be noted that the orthophotograph covers the overlap area of two adjacent photographs rather than the entire area of either one. The orthophotographs may be made with the green-blue filter in either of the two projectors involved. The scale of the orthophotograph negative is the same as the stereoscopic model scale. Enlargements or reductions can be made from the negative in any quantity and at any reasonable enlargement or reduction of scale. In choosing the stereoplotting instrument, the quality of the projected images will generally be a more important factor than the scale of the negative.

The device as herein shown and described is susceptible of modification in details without departing from the basic design and purpose. For example, the motor may be mounted on the movable screen and geared to racks mounted on the frame members with associated reversing switch or switches likewise being mounted on the screen. In this case, the adjustable stops activating the switches would be on the frame member. By means of an attachment for recording vertical motion of the platen as a strip is scanned, a profile of the terrain can be obtained.

It will be appreciated from the foregoing specification that the above-described invention is susceptible of various changes and modifications without departing from the spirit and scope thereof. Many modifications will occur to those skilled in the art within the scope of the following claims.

What I claim as my invention is:

1. A photogrammetric device for producing orthographic reconstituted photographs which comprises, a pair of projectors adapted to project a pair of stereoscopically related transparencies to form a stereoscopic image which is an optical model of the terrain, a platen spaced from said projectors, a sheet positioned on said platen and having on its outer surface a light-sensitive coating, a pair of filters for said projectors, one of which permits actinic light which affects the light-sensitive surface to pass through while the other filter permits non-actinic light to pass through, a screen having a slit means therein adjacent to the light sensitive surface, means for moving said screen in a direction parallel to said platen, said platen being positioned so that said optical model appears to be on the light sensitive coating located thereon, means for raising and lowering said platen so that the slit may be kept on the apparent ground surface of the optical model at all times during the motion of the screen.

2. A device as in claim 1 wherein a rectangular frame having an X and Y axis is positioned above said platen and is parallel thereto, means for mounting said screen in said frame for linear motion in a direction parallel to an axis of the frame, means for moving said screen at a constant speed and means for moving said frame in the direction of its other axis.

3. A device as in claim 2 wherein said slit means are mounted in said screen, and means for rotating said slit about an axis normal to the screen.

4. A device as in claim 3 comprising means for moving said screen at a constant speed, including a motor, means coacting with said motor for imparting translatory motion in a Y-direction to said screen, means for reversing the direction of motion of said screen when it reaches a predetermined position, means for moving said frames a distance in the X-direction equal to the width of the scanning slit simultaneously with the reversal of the motion of the screen.

5. A device as in claim 4 wherein said platen is adjustably attached to a framework, a plurality of vertical screws rotatably mounted in a base frame, means for causing said screws to rotate in unison, nuts threaded on said screws and fastened to said framework, whereby said platen may be moved vertically with respect to said base frame plate.

6. A device as in claim 5 wherein said screen and frame have light shields fastened thereto to shield the sensitized surface not under the scanning slit.

7. A device as in claim 6 wherein two light shields are fastened to the screen each comprising a series of slidable, rectangular, overlapping, opaque plates, the shields being each attached at one end to opposite edges of the screen, and at the other end to corresponding edges of the frame, each plate having two short edges and two long edges, means on the plates near the long edges for engaging the adjacent plates, whereby the light shields are extended and retract as the screen moves in the Y-direction.

8. A device as in claim 7 wherein two light shields are attached to the other two edges of the rectangular frame, each shield comprising a flexible opaque sheet attached at one end to a corresponding frame end, and at the other end to a roller means, means for rotating said roller means an amount corresponding to the amount of translation in the X-direction of the frame, whereby the flexible sheets are wound and unwound on said rollers as said frame is moved.

9. A device as in claim 8 wherein said base is rectangular in shape, and said vertical screws are rotatably mounted at the corners thereof, sprockets fastened to the vertical screws at their lower ends, an endless chain passing over each of said sprockets, a bracket fastened to one side of said base and adjustable for lateral positioning thereon, a horizontal shaft mounted at the upper end of said bracket, a handwheel fastened to the outer end of said shaft, means connecting said shaft with said endless chain for transmitting rotation from the handwheel to the chain, whereby rotation of the handwheel causes base plate to move vertically.

10. A device as in claim 1 wherein said platen raising and lowering means comprises a framework, means for adjustably attaching said platen to the framework, a base frame, a plurality of vertical screws rotatably mounted in said base frame, means for causing said screws to rotate in unison, nuts threaded on said screws and fastened to said framework, whereby said platen may be moved vertically with respect to said base frame.

11. A device as in claim 10 wherein said base frame is rectangular in shape, and said vertical screws are rotatably mounted at the corners thereof, sprockets fastened to the vertical screws at their lower ends, an endless chain passing over each of said sprockets, a bracket fastened to one side of said base frame and adjustable for lateral positioning thereon, a horizontal shaft mounted at the upper end of said bracket, a handwheel fastened to the outer end of said shaft, means connecting said shaft with said endless chain for transmitting rotation from the handwheel to the chain, whereby rotation of the handwheel causes the base plate to move vertically.

12. A photogrammetric device for producing orthographic reconstituted photographs comprising in combination a pair of projectors adapted to project a pair of stereoscopically related transparencies of the object to be photographed, a film supporting platen upon which said transparencies are projected to produce a stereoscopic image which is an optical model of the object, a screen covering said platen having a slit therein for passage of light therethrough, means for progressively moving said screen in predetermined directions parallel to the plane of said platen and means for displacing said platen and screen at right angles to said plane whereby said slit may be kept in register with the surface of said optical model.

No references cited.